July 1, 1947.  D. POLLACK  2,423,404
PLATE DISPENSER FOR AUTOMATIC PHOTOGRAPHIC MACHINES
Filed Oct. 5, 1944
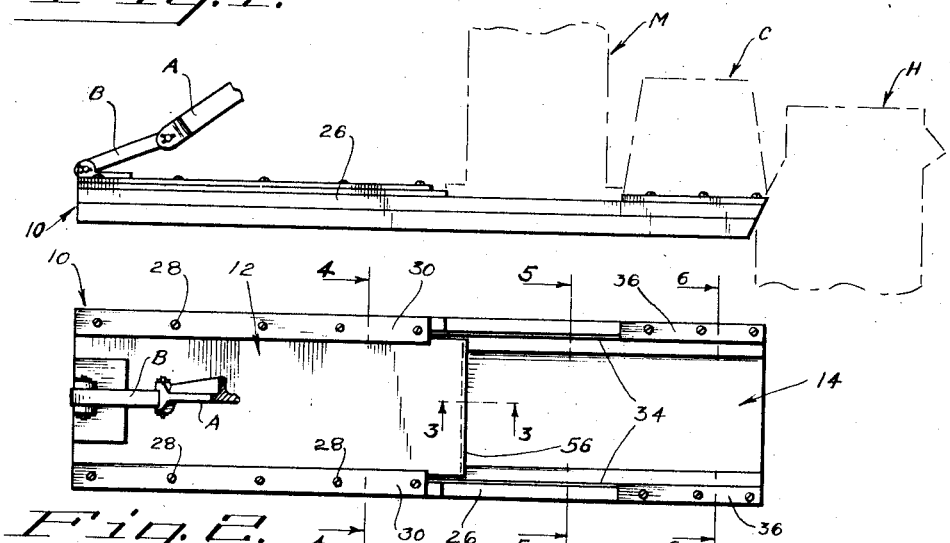
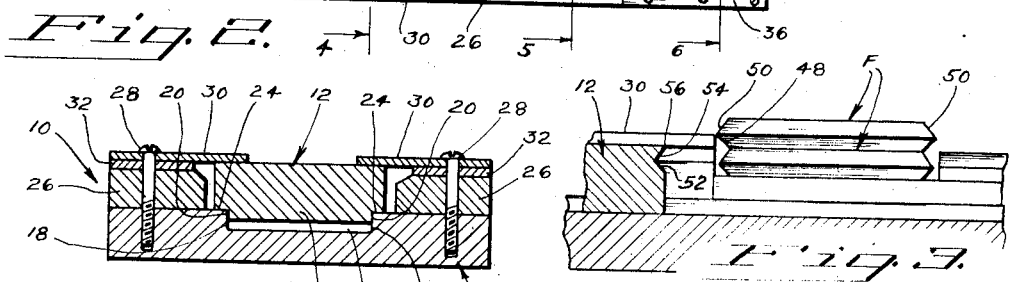
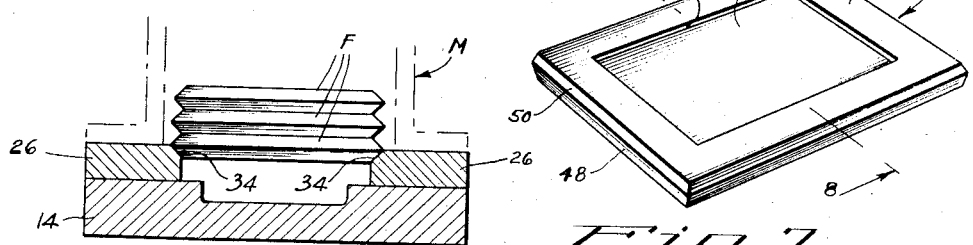
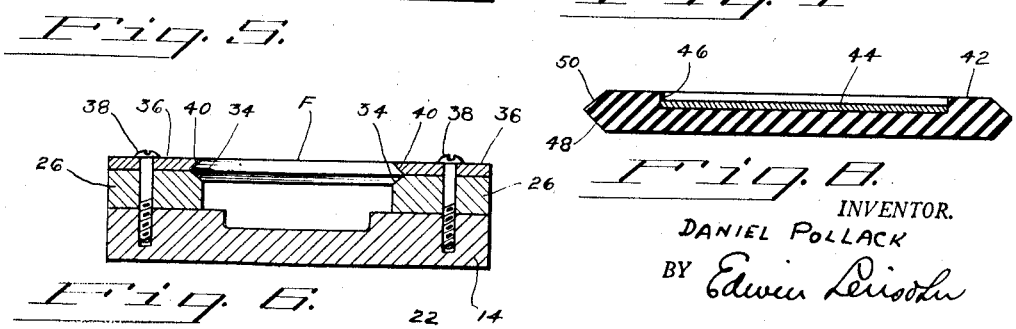
INVENTOR.
DANIEL POLLACK
BY Edwin Levisohn
ATTORNEY.

Patented July 1, 1947

2,423,404

UNITED STATES PATENT OFFICE 2,423,404

PLATE DISPENSER FOR AUTOMATIC PHOTOGRAPHIC MACHINES

Daniel Pollack, Forest Hills, N. Y., assignor to International Mutoscope Corporation, Long Island City, N. Y., a corporation of New York Application October 5, 1944, Serial No. 557,250

4 Claims. (Cl. 95—13)

This invention relates to automatic photographic machines or apparatus of the type which dispense framed photographs and to frame-plates for use in such machines.

One object of the present invention is to provide an automatic photographic machine of the type shown by United States Patent No. 2,192,755 granted March 5, 1940, with improved means for transferring the photographic frame-plates from their supply magazine to the camera and from the latter to the chamber in which the plate is treated, following its exposure in the camera. More particularly, in accordance with this object of the invention, provision is made for supporting the photographic frame-plates and the projector by which said plates are transferred from their supply magazine to the camera and to said chamber in separate guideways, respectively, with the advantageous result that wear of the guideway for the frame-plate projector does not impair or interfere with the transfer of the frame-plates from the supply magazine. In this connection, it will be understood that the frame-plates are transferred one at a time from the supply magazine and that when the projector operates in the same guideway as that in which the frame-plates are moved, it sometimes happens that said guideway becomes worn to such an extent that the frame-plates move downwardly in the supply magazine a distance greater than the thickness of one frame-plate, with the result that the projector instead of engaging only the lowermost frame-plate may engage two frame-plates at the bottom of the magazine, thereby causing jamming of the frame-plates or other interference with the operation of the machine. The present invention eliminates the possibility of this improper operation of moving the frame-plates from the supply magazine.

The above and other objects, features and advantages of the invention will be more fully understood from the following description considered in connection with the accompanying illustrative drawings.

In the drawings:

Fig. 1 is a front view of the guide and frame-plate projector embodying the present invention, the supply magazine, camera, and frame-plate treating chamber being indicated more or less diagrammatically in dotted lines to show their positions in relation to said guide and projector;

Fig. 2 is a top plan view of the guide and projector;

Figs. 3 to 6 are sectional views, on a larger scale, on the lines 3—3, 4—4, 5—5 and 6—6, respectively, of Fig. 2;

Fig. 7 is a perspective view of a photographic frame-plate embodying the present invention;

Fig. 8 is a sectional view on the line 8—8 of Fig. 7.

Referring now to the drawings in detail, the guide 10 of the present invention is shown disposed in horizontal position below the frame-plate supply magazine M and the camera C, substantially in the same way as in the above mentioned Patent No. 2,192,755. It will be understood that the photographic frame-plates are disposed in stacked relation, with the sensitized plates uppermost, in the supply magazine M and are transferred one at a time during one operation of the machine from the bottom of the magazine M to the camera C where the sensitized plate carried by the frame-plate is exposed for taking a picture. The chamber H in which the plate is treated after exposure thereof in camera C, as described in said patent, is positioned at the end of guide 10 as illustrated diagrammatically in Fig. 1. The photographic frame-plate projector for transferring the lowermost frame-plate from the magazine M to the camera C and from the latter to the treating chamber H is reciprocated longitudinally of guide 10 and for that purpose said slide projector is connected at one end thereof to an actuating arm A by means of a link B which is pivotally connected at its opposite ends to said slide projector and arm, respectively. As the means for moving the projector 12 may be the same as that shown in said patent, and does not form part of the present invention, further illustration thereof is unnecessary.

In accordance with the present invention, the guide 10 is constructed to provide separate guideways for the projector 12 and for the photographic frame-plates, respectively. As illustrated in Fig. 4, guide 10 has a lower plate 14 provided with a recess 16 defined by parallel longitudinally extending side walls 18 which are slidably engaged by the lower parallel side edge portions 20 of projector 12. As here shown, said lower side edges 20 of guide 12 constitute the side edges of the lower reduced portion 22 of projector 12. Said reduced portion provides the projector with shoulders 24 by which the projector is supported on guide plate 14 for movement longitudinally thereof. Laterally spaced guide rails 26 are mounted on guide plate 14 adjacent the opposite side edges thereof and are secured thereto in any suitable way as by screws 28. Said securing means 28 also secures laterally spaced longitudinally extending straps 30 to guide rails 26 with intervening spacing members 32 therebetween. Straps 30 overlie the upper marginal edge portions of projector 12, being slidably engaged by the latter during its movement, for retaining the projector 12 in its guideway.

The guideway for the photographic frame-plates is constituted by the guide rails 26. As illustrated in Figs. 5 and 6, guide rails 26 are provided with upper inner edge portions 34 which are bevelled or inclined downwardly toward each other to correspond to the bevelled side edges of the photographic frame-plates F hereinafter more specifically referred to. It will be noted that the straps 30 which overlap the projector 12 terminate in the region of the guide 10 which is below the supply magazine M so as not to interfere with the downward movement of the lowermost frame-plate F into the frame-plate guideway of guide 10. Forwardly beyond the part of the guide which is below the supply magazine M, there are provided longitudinally extending straps 36 which are secured to the top of guide rails 26 in any suitable way as by screws 38. These straps have inner bevelled edges 40 which overlie the correspondingly bevelled edge portions of frame-plate F for retaining the latter in its guideway.

From the above description of guide 10 it is apparent that the guideway for the frame-plates F is of such construction in relation to the guideway for the projector 12 that the frame-plates are supported out of contact with the guideway for the projector so that wear of said last mentioned guideway which may be caused by the repeated reciprocation of projector 12 is confined to said projector-guideway and does not effect said frame-plate guideway. Likewise, it will be understood that since the frame-plate guideway is subjected to negligible wear by the movement of the frame-plates, only the lowermost frame-plate in the magazine is engageable by the frame-plate projector even after the machine has been in operation for a long period of time.

The photographic frame-plate F comprises a frame 42 in which the sensitized plate 44 is mounted. As illustrated in Figs. 7 and 8, frame 42 is provided with a recess 46 at one side thereof, that is at the front of the frame, in which the sensitized plate 44 is secured, said recess constituting said frame as a tray for the chemicals or other liquids with which the plate 44 is treated in chamber H following the exposure thereof in the camera C during the operation of the photographic machine. As here shown, frame 42 is formed in one piece and can be conveniently made by molding the same from a suitable plastic. The peripheral edge of frame 42 is bevelled and as illustrated in the drawings has a peripheral bevelled straight edge 48 to conform to the bevelled edges 34 of guide rails 26 and a peripheral rectilinear bevelled edge 50 which conforms to the bevelled edges 40 of straps 36. The side edge of the frame is defined by the converging marginal edge portions of the frame as shown. More particularly, as shown, the outer edge of the frame extending in the direction of the thickness of the frame has a portion 48 inclined from the outer boundary of the frame to the back of the frame and a portion 50 which is inclined to the front of the frame, said portions 48 and 50 extending in opposite directions from an intermediate point in the thickness of the frame. The forward end of projector 12 is provided at its upper edge with a recess 52 defined by inclined straight edges or straight wall portions 52 and 54 (Fig. 3) which conform to and engage the portions of bevelled edges 48 and 50, respectively, at the adjacent straight side edge of the frame-plate F in the operation of transferring the frame-plate from the supply magazine to the camera C. It will be noted that the upper surface of projector 12 is disposed substantially in the plane of the upper surface of the lowermost frame-plate F in the supply magazine M, so that when projector 12 is moved to the right, viewing Fig. 3, for transferring said lowermost frame-plate F from the magazine to the camera, said projector engages only said lowermost frame-plate and rides under the next frame-plate at the bottom of the magazine. Further, it will be observed that by reason of the provision of the forward end of projector 12 with the inclined edges 54 and 52 and by reason of the provision of the frame 42 with the correspondingly inclined edges 48 and 50. Only the lowermost frame-plate F in the supply magazine is effectively engaged by the projector 12 even if, due to irregularities in the frame-plates or for some other reason, the upper surface of projector 12 is somewhat above the upper surface of the lowermost frame-plate, since in such case the forward upper edge 56 of projector 12 will engage the bevelled edge 48 of the frame-plate F above the lowermost frame-plate thereby raising the same sufficiently to permit the projector 12 to pass therebelow while projecting the lowermost frame-plate out of the magazine and transferring said lowermost frame-plate to the camera. It will be understood that while the frame-plates are advantageously formed of a plastic and in one piece, it is within the scope of this invention, unless otherwise specifically defined in the claims, to form the frame-plates of other materials and in more than one piece. For example, said frame-plates can be formed in one or more parts of metal, paper, glass, molded saw dust, etc., or of combinations of these or similar materials. Likewise, it will be understood the peripheral edges of the frame-plates can be inclined or bevelled toward the back of the frame-plate along a curved or rounded surface instead of along a planar surface.

It will be understood that the invention may be embodied otherwise than as herein specifically illustrated or described without departing from the underlying idea or principles of the invention within the scope of the appended claims.

Having thus described my invention, what I claim and desire to secure by Letters Patent is:

1. In an automatic photographic machine of the type which is provided with a frame-plate magazine and a camera, a guide and a projector for the projection of said frame-plates from the magazine to the camera, said guide comprising a horizontal member having a recess extending longitudinally thereof and defined by laterally spaced side walls, said projector having a lower portion projecting into said recess and provided with side edge portions in slidable guiding engagement with said side walls, respectively, and shoulders engageable with said guide member above said recess for supporting said projector, for movement on said guide member, and means secured to said member above said recess providing guides for said frame plates, whereby the projector and frame-plates are supported for sliding movement in their own guideways, respectively.

2. In an automatic photographic machine of the type which is provided with a frame-plate magazine and a camera, a guide and a projector for the projection of said frame-plates from the magazine to the camera, said guide comprising a guideway in which said projector is slidably supported and a second guideway separate from said first mentioned guideway for supporting said plates in the movement thereof by said projector from said magazine to said camera, said first mentioned guideway comprising a horizontal member having a recess, extending longitudinally thereof and defined by laterally spaced side walls, said projector having a lower portion projecting into said recess and provided with side edge portions in slidable guiding engagement with said side walls, respectively, and shoulders engageable with said guide member above said recess for supporting said projector, for movement on said guide member, said guideway for the frame plates comprising laterally spaced longitudinal members secured to said horizontal member above said recess and having plate supporting surfaces for supporting the plates out of contact with the support for said projector.

3. In an automatic photographic machine in which photographic frame-plates having bevelled edges are treated, said machine having a supply-magazine for said plates and a camera in which the plates are exposed; means for transferring said plates from said magazine to said camera comprising a guide having a guideway, a projector slidable in said guideway and having a forward end engageable with the lowermost frame-plate in the magazine for moving said lowermost frame-plate from said magazine to said camera, said guide having a guideway above said first mentioned guideway for slidably supporting said plates out of contact with said first mentioned guideway and comprising longitudinal guide-members having bevelled edges engaging and supporting the bevelled edges of said frame-plates while the latter are moved by said projector.

4. Apparatus for moving photographic frame plates from a magazine to a camera, comprising a guide and a projector for the projection of said frame-plates from the magazine to the camera, said guide comprising a guideway in which said projector is slidably supported and a second guideway separate from said first mentioned guideway for supporting said plates in the movement thereof by said projector from said magazine to said camera, said first mentioned guideway comprising a horizontal member having a recess extending longitudinally thereof and defined by laterally spaced side walls, said projector having a lower portion projecting into said recess and provided with side edge portions in slidable guiding engagement with said side walls, respectively, and shoulders engageable with said guide member above said recess for supporting said projector, for movement on said guide member, said guideway for the frame plates comprising laterally spaced longitudinal members secured to said horizontal member above said recess and having plate supporting surfaces for supporting the plates out of contact with the support for said projector.

DANIEL POLLACK.

REFERENCES CITED

The following references are of record in the file of this patent:

UNITED STATES PATENTS

| Number | Name | Date |
|---|---|---|
| 2,247,834 | Davis, Jr., et al. | July 1, 1941 |
| 708,165 | Pifer | Sept. 2, 1902 |
| 2,149,636 | Slaughter | Mar. 7, 1939 |
| 1,757,130 | McCowan | May 6, 1930 |
| 478,780 | Bristol | July 12, 1892 |
| 2,192,755 | Rabkin et al. | Mar. 5, 1940 |
| 1,877,598 | Sax | Sept. 13, 1932 |
| 1,113,568 | Mandel | Oct. 13, 1914 |

FOREIGN PATENTS

| Number | Country | Date |
|---|---|---|
| 46,423 | Germany | Apr. 1, 1889 |